United States Patent
Müller

(10) Patent No.: US 7,712,772 B2
(45) Date of Patent: May 11, 2010

(54) THORAX AIRBAG DEVICE, SEAT PROVIDED WITH THE SAME AND METHOD FOR ACTIVATING SAID THORAX AIRBAG

(75) Inventor: Olaf Müller, Rüsselsheim (DE)

(73) Assignee: INOVA GmbH, Russelsheim (DE)

( * ) Notice: Subject to any disclaimer, the term of this patent is extended or adjusted under 35 U.S.C. 154(b) by 450 days.

(21) Appl. No.: 11/568,290

(22) PCT Filed: Apr. 26, 2005

(86) PCT No.: PCT/DE2005/000765

§ 371 (c)(1),
(2), (4) Date: Apr. 10, 2007

(87) PCT Pub. No.: WO2005/102789

PCT Pub. Date: Nov. 3, 2005

(65) Prior Publication Data

US 2007/0164545 A1 Jul. 19, 2007

(30) Foreign Application Priority Data

Apr. 26, 2004 (DE) .................. 20 2004 006 562 U

(51) Int. Cl.
*B60R 21/207* (2006.01)
(52) U.S. Cl. ............... 280/730.2; 280/728.2; 280/728.3
(58) Field of Classification Search ............. 280/728.3, 280/730.2, 728.2, 743.1
See application file for complete search history.

(56) References Cited

U.S. PATENT DOCUMENTS

| 5,762,363 | A | * | 6/1998 | Brown et al. ............. 280/730.2 |
| 5,810,389 | A | * | 9/1998 | Yamaji et al. ............ 280/730.2 |
| 5,927,749 | A | | 7/1999 | Homier et al. |
| 5,938,232 | A | * | 8/1999 | Kalandek et al. ......... 280/730.2 |
| 6,045,151 | A | | 4/2000 | Wu |
| 6,299,197 | B1 | | 10/2001 | Mueller |
| 6,357,789 | B1 | * | 3/2002 | Harada et al. ............ 280/730.2 |
| 6,439,597 | B1 | * | 8/2002 | Harada et al. ............ 280/728.2 |
| 6,550,803 | B1 | * | 4/2003 | Derrick ................... 280/728.3 |
| 2001/0052693 | A1 | * | 12/2001 | Mueller ................... 280/730.2 |

FOREIGN PATENT DOCUMENTS

| DE | 198 60 840 A1 | 9/1999 |
| EP | 0 782 944 | 7/1997 |
| JP | 09 071205 A | 3/1997 |
| JP | 09 071205 A | 7/1997 |
| JP | 10-310017 | 11/1998 |
| JP | 10 310018 | 11/1998 |
| JP | 10 310018 | 2/1999 |

* cited by examiner

*Primary Examiner*—Ruth Ilan
*Assistant Examiner*—Keith Frisby
(74) *Attorney, Agent, or Firm*—Martin Fleit; Paul D. Bianco; Fleit Gibbons Gutman Bongini & Bianco PL

(57) ABSTRACT

The invention relates to a thorax airbag device without housing which is mounted between a guide yoke and a tearing thread. The invention also relates to a seat which is provided with a thorax airbag device without housing which is mounted by a guide yoke and a tearing thread.

8 Claims, 18 Drawing Sheets

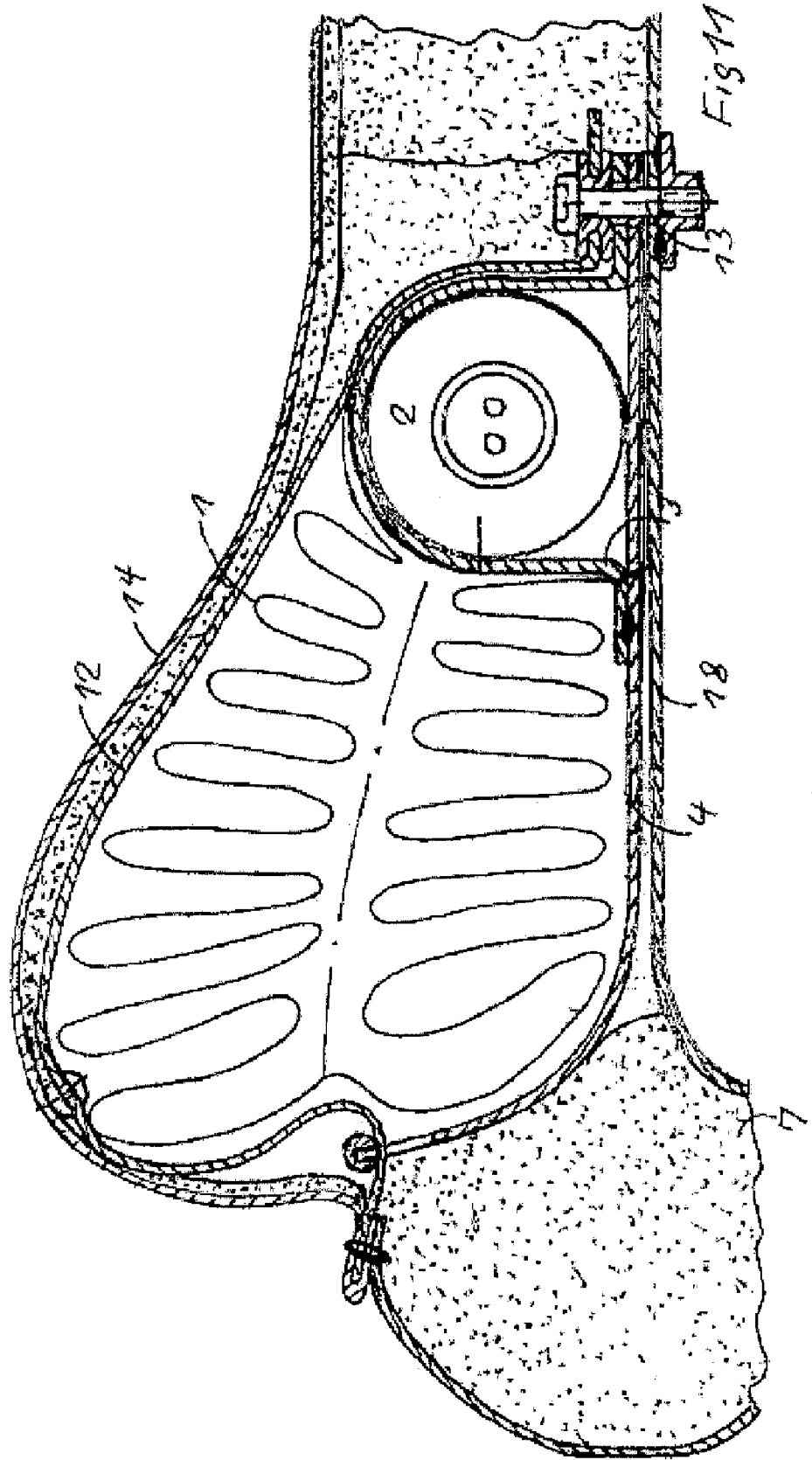

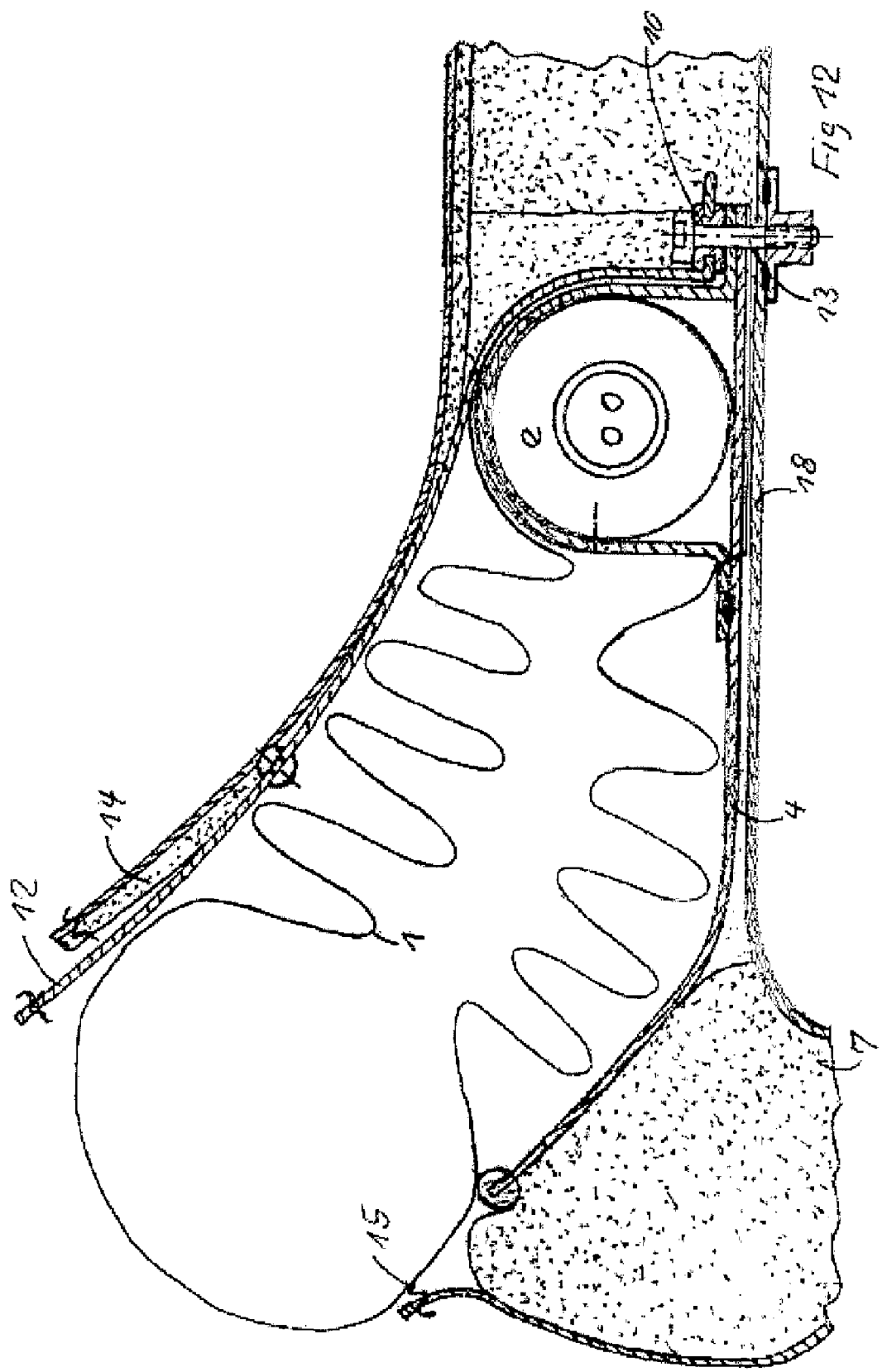

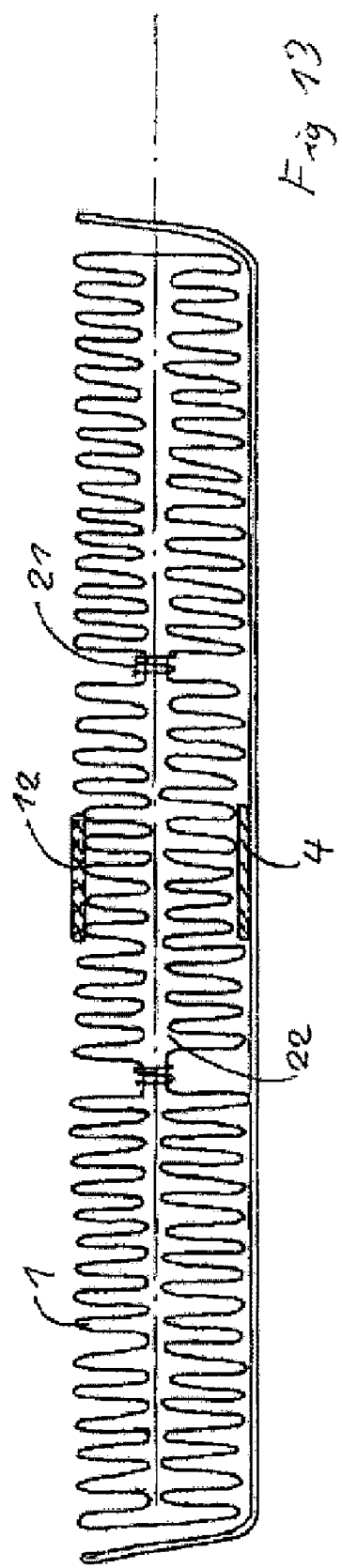

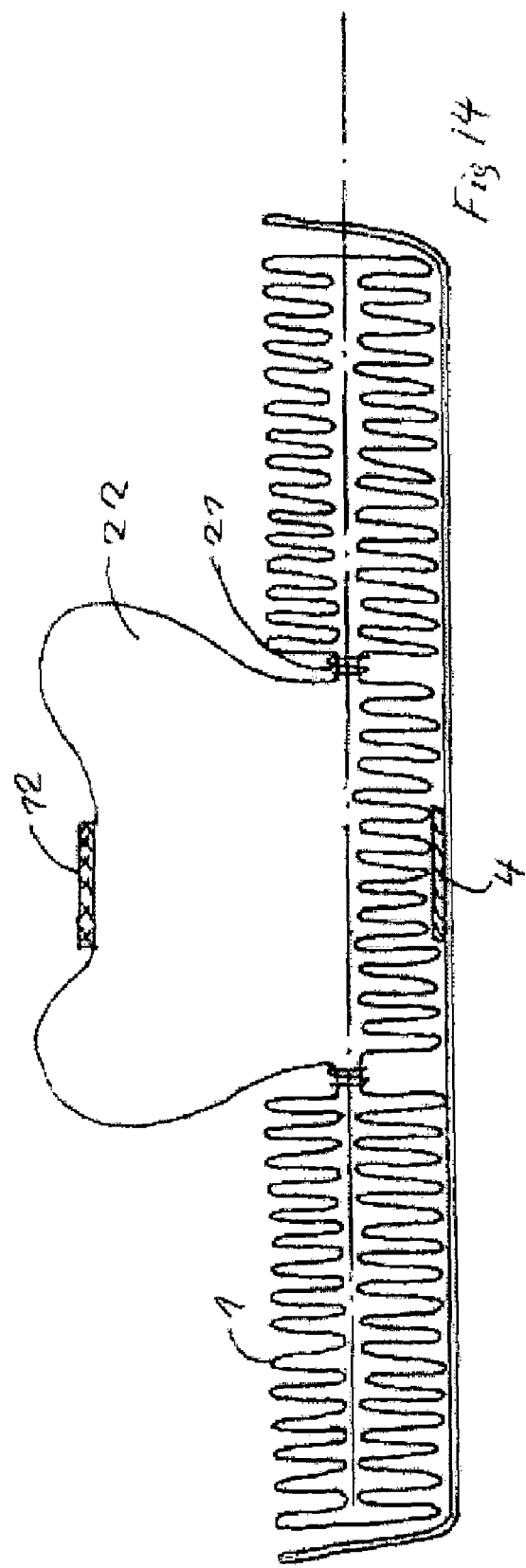

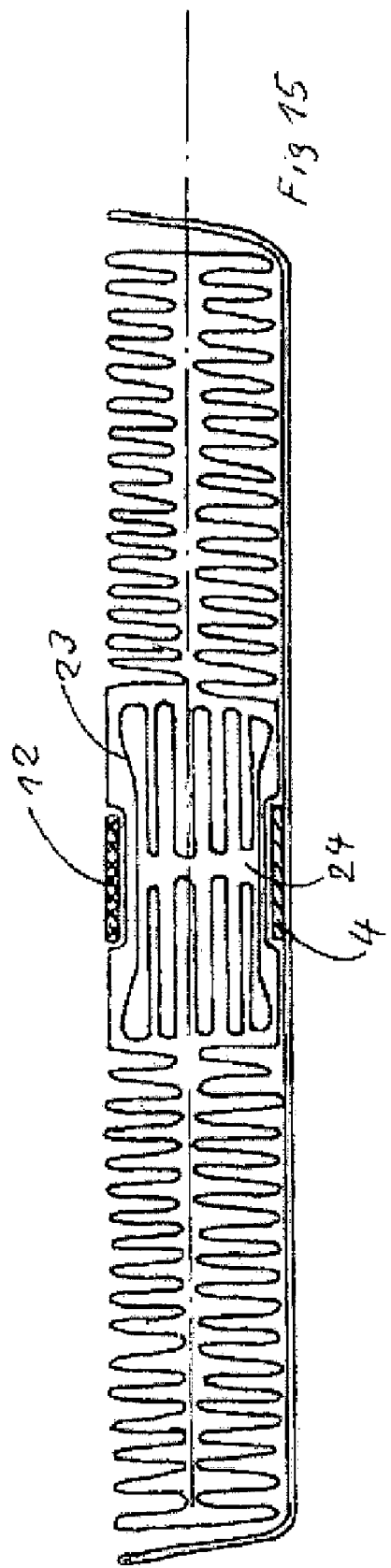

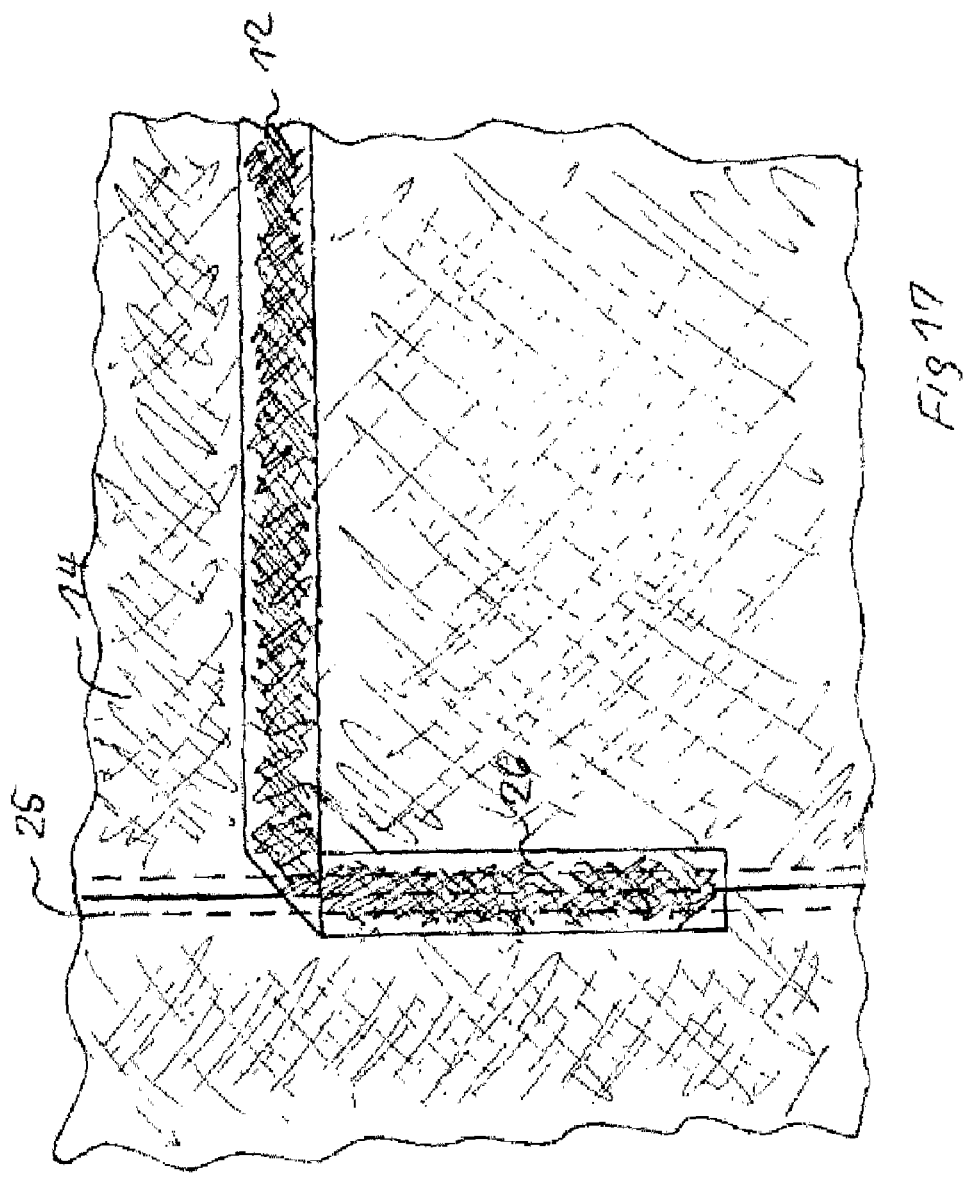

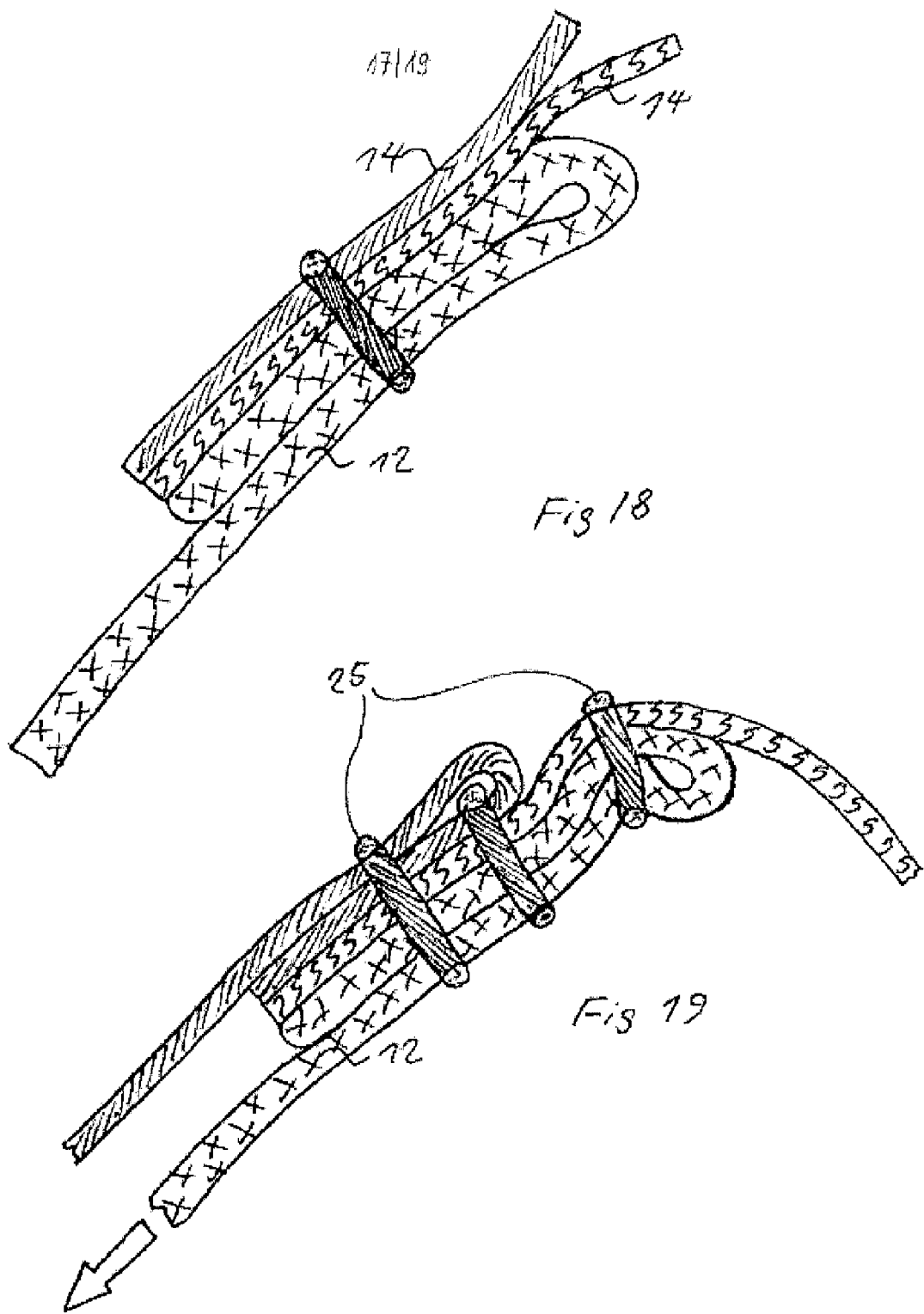

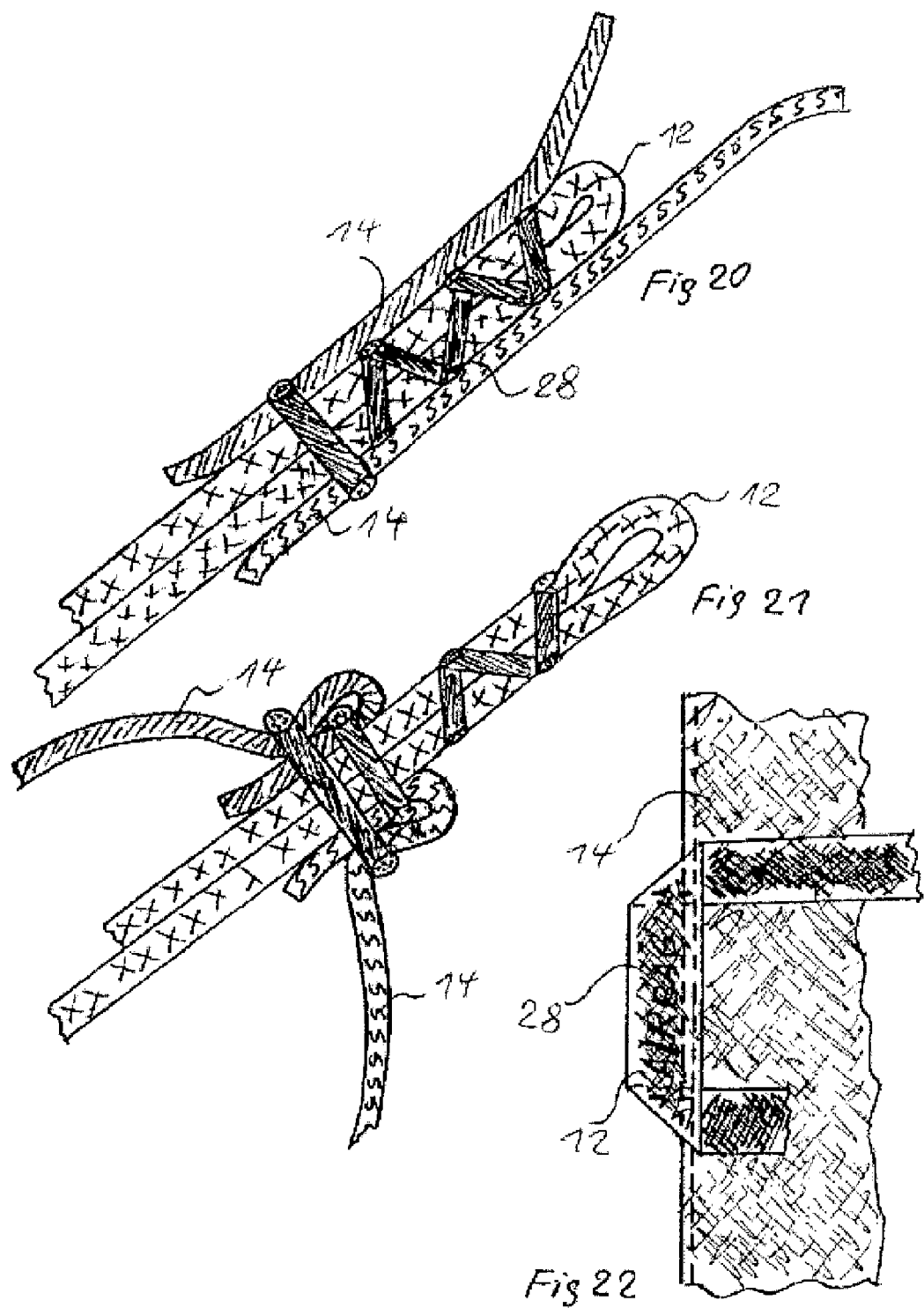

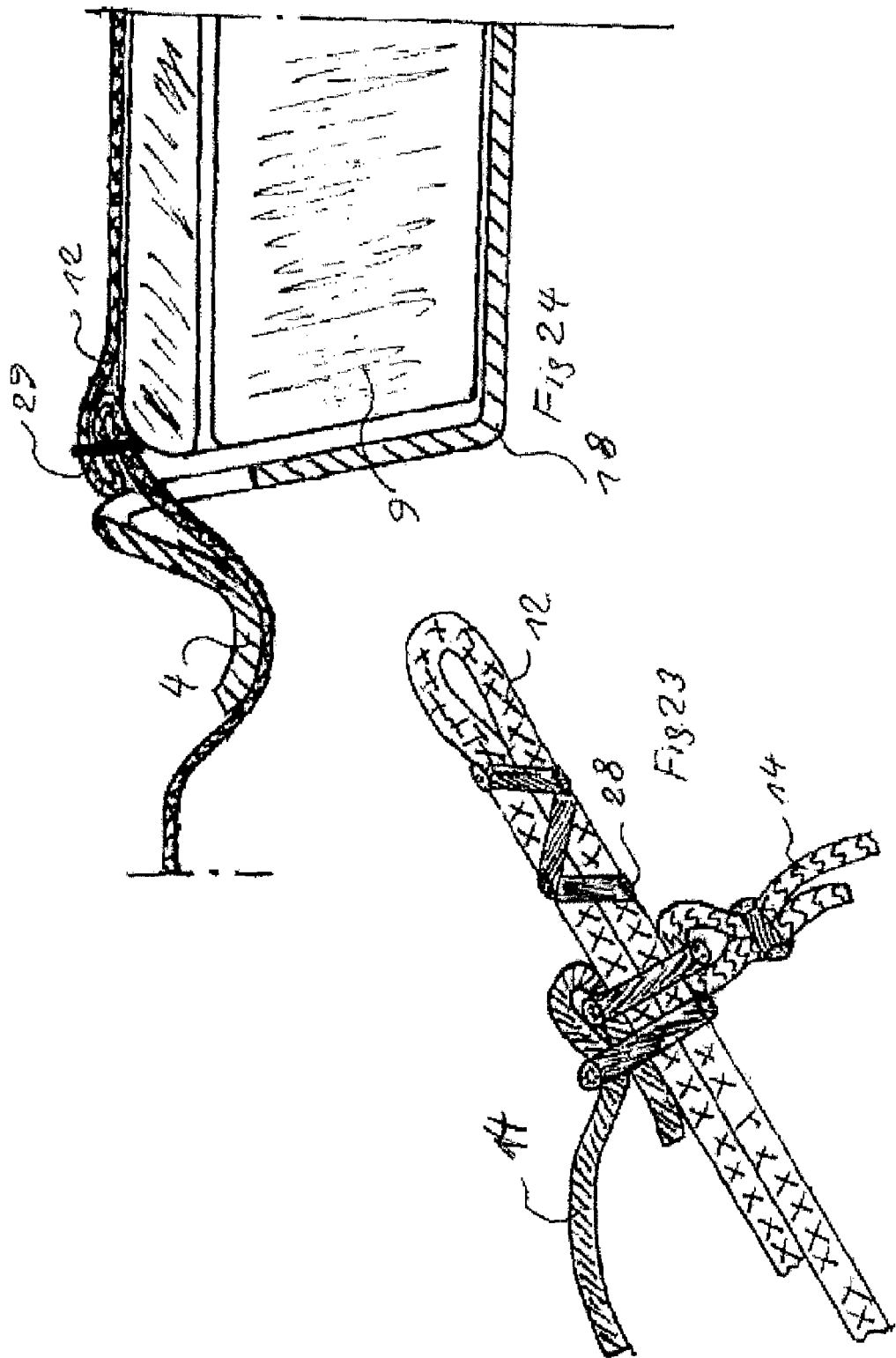

THORAX AIRBAG DEVICE, SEAT PROVIDED WITH THE SAME AND METHOD FOR ACTIVATING SAID THORAX AIRBAG

FIELD OF THE INVENTION

The invention relates to thorax airbag devices and seats provided with these devices, as well as to methods for activating the thorax airbags. In particular, the present invention relates to the housing of a thorax airbag in a seat back, as well as to the opening function of the seat back for discharging the thorax airbag.

BACKGROUND OF THE INVENTION

Most thorax airbags, or "thorax bags" for short, are housed in a seat back according to examples that have become known in practice. Here one distinguishes among several types:

Manufacturers of OPEL brand cars, CITROEN brand cars, and other manufacturers of cars position the airbag module in a visible container, whose cover opens in a crash. This looks cheap and the container is heavy and expensive.

Other manufacturers, primarily luxury-car manufacturers install an "invisible"airbag under the covering material. Because the covering materials with their different elasticity values counteract the unfolding with different amounts of resistance, and thus prolong the unfolding time, the manufacturers provide various measures. The manufacturer of VW brand cars, for example, uses only low-stretch materials. The manufacturer of FORD brand cars sews a woven packing for the tearing seam of the covering with a hard material in the bursting area. The manufacturer of RENAULT brand cars has a divided side wall with an inserted frame through which the bag is deployed.

The inventor himself has already solved the problem of low-stretch materials with the "run technique," which is disclosed in the already granted U.S. Pat. No. 6,299,197 and the parallel, laid-open German Patent Application No. 198 60 840.3. The complete disclosure contents from these earlier applications, especially in terms of the triggering and deployment of the thorax airbag from a seat through a seat covering, are incorporated completely into the present document through this reference, to avoid simple repetition.

SUMMARY OF THE INVENTION

The present invention has and achieves the goal of further improving the prior art.

The present invention also tears a run in the cover. The opening of the cover during airbag unfolding starts with this "run." In the present invention, the run is not generated by thread, but instead by a sewn, more easily handled strip. This strip is not fixed in the module housing base of an airbag module and guided through the housing cover, as in the corresponding embodiments of said earlier applications of the inventor, but instead a guide lever guides the strip. Simultaneously, the airbag is "packed" between this guide lever and the run strip.

In this way, the advantage is achieved that such a thorax airbag can eliminate a housing.

Preferred configurations according to the invention are listed below:

1. Thorax airbag device mounted without a housing between a guide yoke and a run-tearing strip.

2. Seat with a thorax airbag device mounted without a housing between a guide yoke and a run-tearing strip.

3. Seat according to 1, constructed such that a run-tearing strip is sewn onto a seat covering with a tearing seam.

4. Thorax airbag device, or seat provided with this device, according to one of the preceding points, wherein the run-tearing strip is led through the guide yoke.

5. Thorax airbag device, or seat provided with this device, according to one of the preceding points, wherein the run-tearing strip is screwed by means of a captive screw or rivet to a module as a guarantee for secure mounting, preferably as part of a verification step.

6. Thorax airbag device, or seat provided with this device, according to one of the preceding points, wherein guide yoke, mounting plate, and attachment yoke form a support unit for a generator or a frame for the entire module and are used as a support for the airbag.

7. Thorax airbag device, or seat provided with this device, according to one of the preceding points, wherein a sliding film is added to the guide yoke in order to better direct the airbag and to prevent the blow-out of foam material.

8. Thorax airbag device, or seat provided with this device, according to one of the preceding points, wherein a covering of the uneven surface with foam cloth as part of the seat foam is coupled to a film hinge and constructed such that space remains for the run-tearing strip.

9. Thorax airbag device, or seat provided with this device, according to one of the preceding points, wherein a thin, adhered paper is provided that holds the airbag folds in position for assembly.

10. Thorax airbag device, or seat provided with this device, according to one of the preceding points, wherein the run-tearing strip is sewn to the tearing seam.

11. Thorax airbag device, or seat provided with this device, according to one of the preceding points, wherein the run-tearing strip emerges from the tearing seam as a visible airbag label.

12. Thorax airbag device, or seat provided with this device, according to one of the preceding points, wherein a perceivable raised section is formed on the run-tearing strip at the position of the passage through the guide yoke.

13. Thorax airbag device, or seat provided with this device, according to 12, wherein a parallel guide yoke sliding block and the perceivable raised section, for example, a rivet, provide evidence of correct assembly, and in particular constitute a verification step.

14. Thorax airbag device, or seat provided with this device, according to one of the preceding points, wherein the airbag is provided with a sewn, adhered center zone, such that this applies pressure first to the run-tearing strip for generating an early run.

15. Thorax airbag device, or seat provided with this device, according to one of the preceding points, wherein an additional auxiliary bag is provided between the guide yoke and run-tearing strip and this auxiliary bag opens the tearing seam more quickly with smaller volume and higher pressure (sturdier textile) and distributes the gas in a predetermined way through targeted weakening of its own tearing seams.

Preferred and/or advantageous configurations of the invention follow from the claims and their combinations, as well as from the entire present application documents.

BRIEF DESCRIPTION OF THE DRAWINGS

The invention is explained in more detail below using embodiments, merely as examples, with reference to the drawings, in which:

FIG. 11 clearly shows a first embodiment of a method for activating a thorax airbag in a seat in a schematic section view;

FIG. 12 clearly shows the first embodiment of a method for activating a thorax airbag in a seat from FIG. 11 in a schematic section view, at a time in the course of the thorax airbag activation that is later than FIG. 11;

FIG. 13 clearly shows a detail of the first embodiment of a method for activating a thorax airbag in a seat from FIGS. 11 and 12 in a schematic section view;

FIG. 14 clearly shows another detail of the first embodiment of a method for activating a thorax airbag in a seat front FIGS. 11 and 12 in a schematic section view;

FIG. 15 shows a detail of a second embodiment of a thorax airbag device in a schematic section view;

FIG. 16 shows a detail of a third embodiment of a thorax airbag device in a schematic section view; and FIGS. 17-24 show alternative embodiments in schematic views.

DETAILED DESCRIPTION OF THE INVENTION

Figure 1:
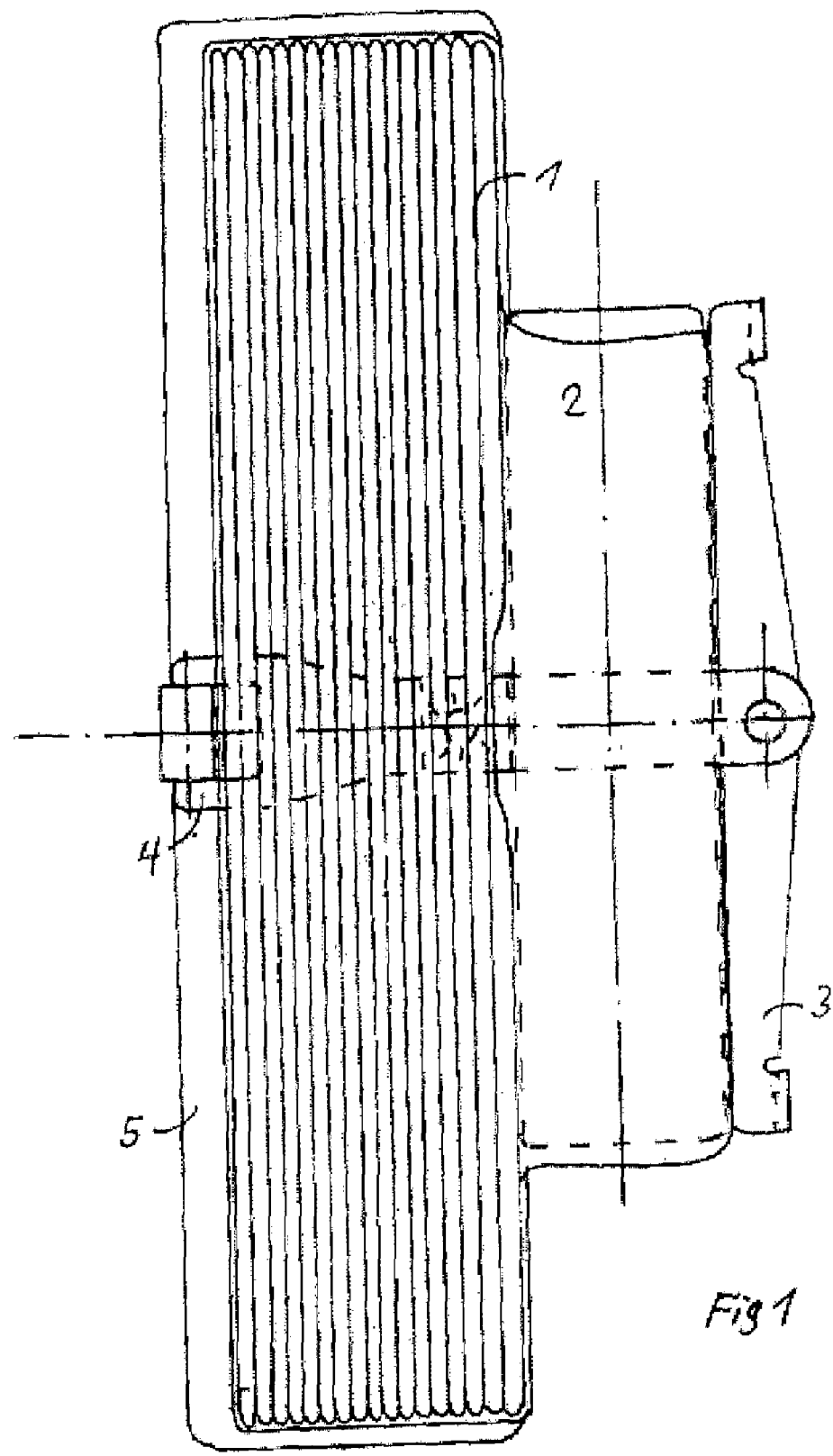
FIG. 1 shows a first embodiment of a thorax airbag device in a schematic top view.

The invention is explained in more detail below with reference to embodiments and examples described below and shown in the drawings and used merely as examples, i.e., it is not limited to these embodiments and examples or to the respective feature combinations within individual embodiments and examples. Features of the method and device also follow analogously from descriptions of the device and method, respectively.

Individual features, which are indicated and/or described in connection with actual embodiments, are not limited to these embodiments or combinations with the other features of these embodiments, but instead can also be combined with any other variants within the scope of what is technically possible, even if they are not separately discussed in the present documents.

Identical reference symbols in the individual figures and diagrams of the drawings designate identical or similar components or components acting identically or similarly. With reference to the illustrations in the drawing, those features that do not have reference symbols also become clear, independently of whether or not such features are described below. On the other hand, features that are contained in the present description but that are not visible or shown in the drawing are also understandable without additional means for someone skilled in the art.

FIG. 1 shows a module of an airbag device with an airbag 1 in top view. A mounting plate 3 and, at a right angle to this plate, a guide yoke 4, is attached to a generator 2 of the airbag device, as is technically usual. The latter module is an especially preferred configuration of the invention.

Figure 2:
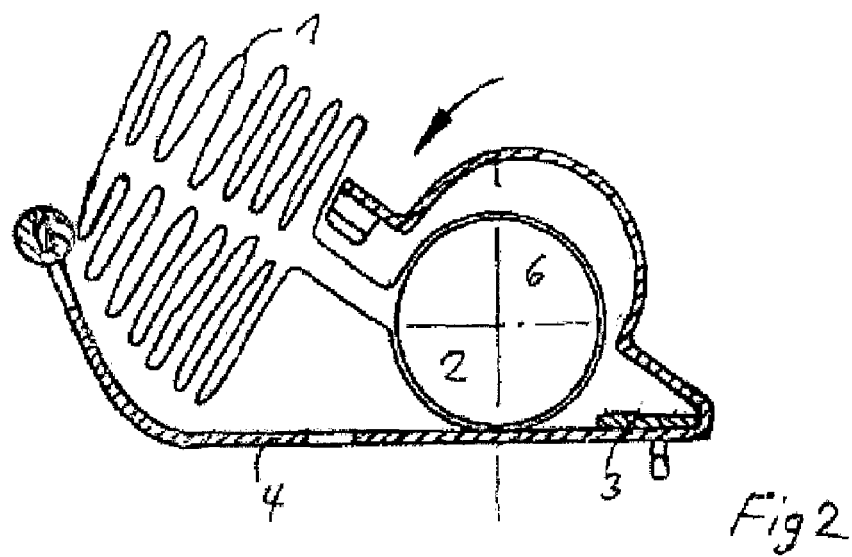
FIG. 2 shows the first embodiment of a thorax airbag device from FIG. 1 in a schematic section view.

A folded airbag 1 is folded, e.g., around the generator 2 or a tube 6, in which the generator is then inserted, as shown in FIG. 2. The guide yoke 4 is fixed, as shown, perpendicular to the generator 2 or its tube 6 and traps the airbag 1.

When the airbag unfolds, in order to avoid ripping cushioning foam 7 of a seat (not shown in FIGS. 1 and 2) as reliably as possible, the guide yoke 4 alternatively "widens" through a sliding film 5, by means of which the airbag 1 slides outwards from its cavity 8.

Figure 3:
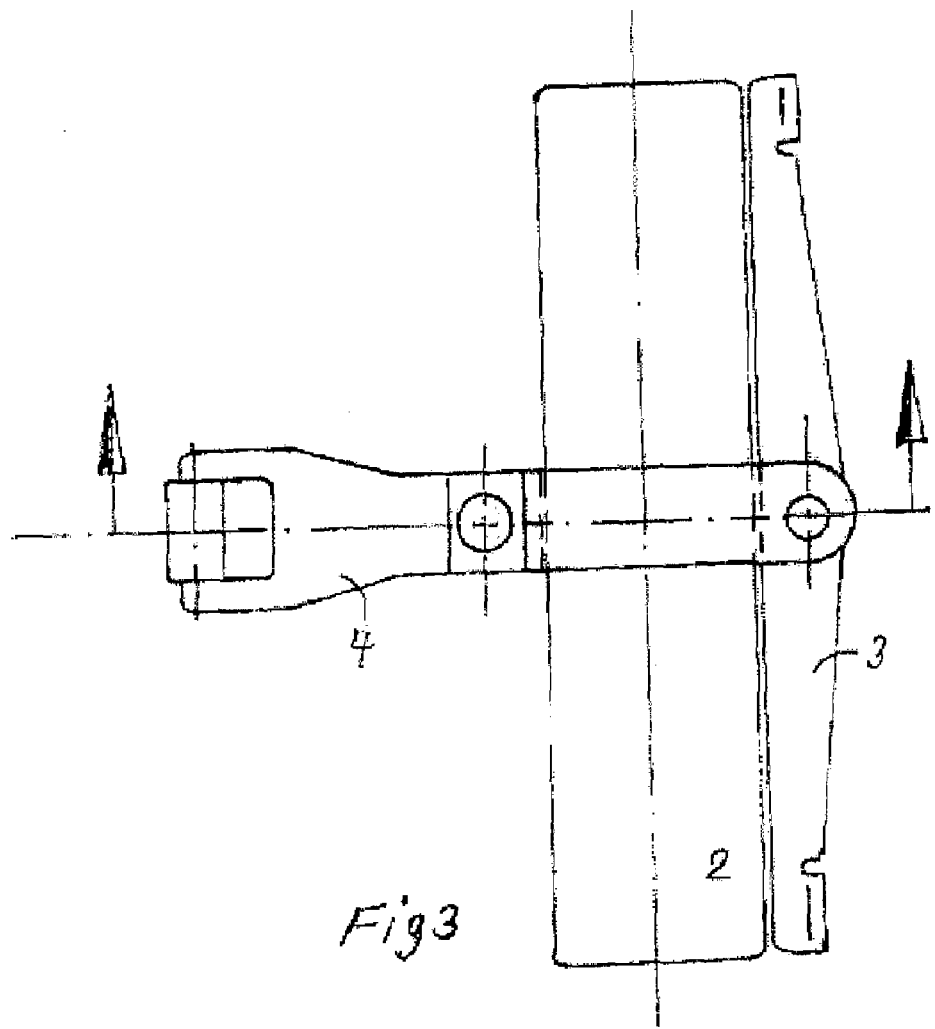
FIG. 3 shows a detail of the first embodiment of a thorax airbag device from FIG. 1, partially opened, in a schematic top view.

FIG. 3 shows the subassembly of generator 2, mounting plate 3, and guide yoke 4.

Figure 4:
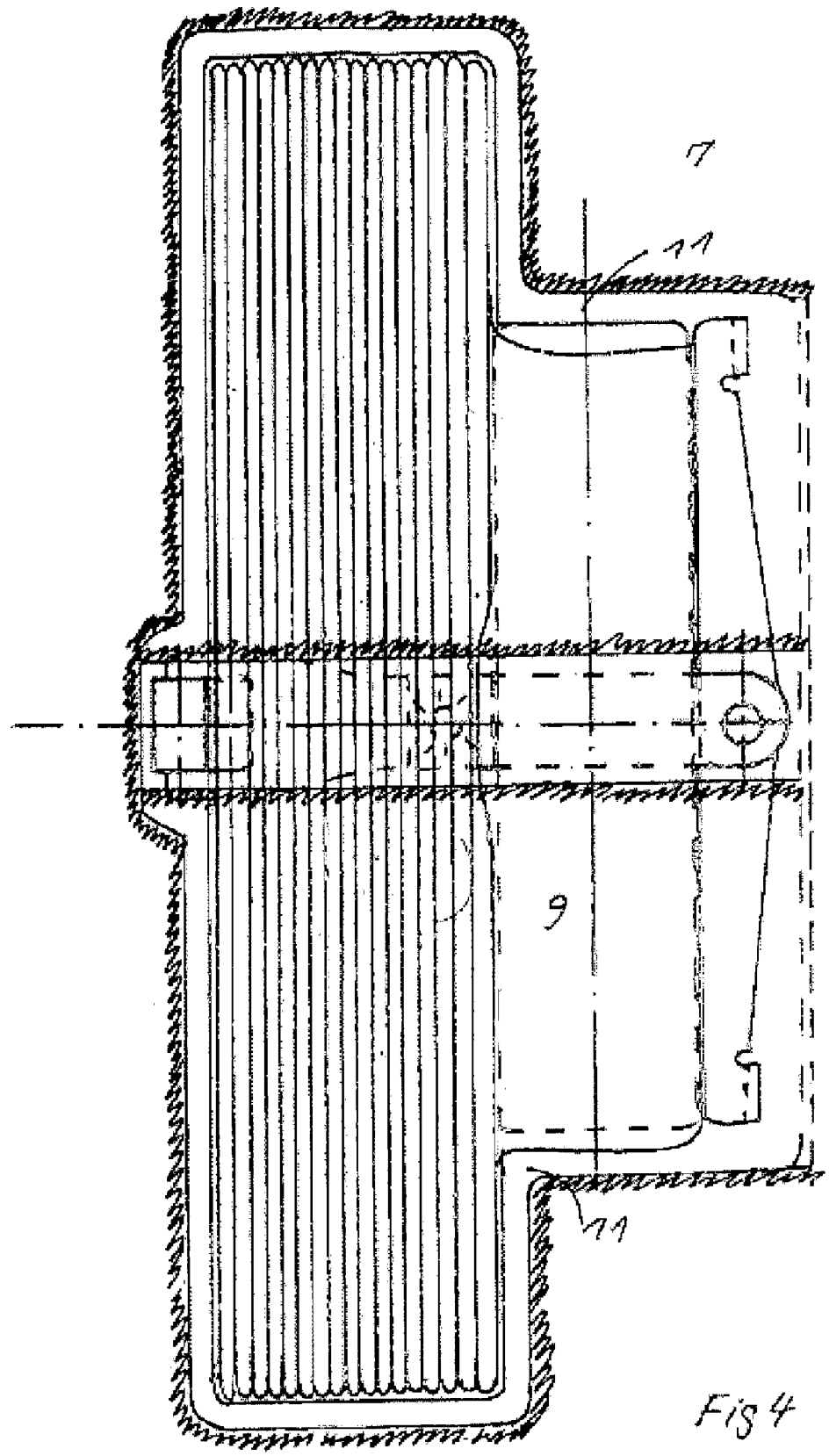
FIG. 4 shows a first embodiment of a seat with a thorax airbag device, partially opened, in a schematic top view.

According to FIG. 4, a complete module 9 is inserted into the cavity 8 in cushioning foam 7. If one wants a perfect surface, the "uneven" module 9 is covered over its surface with two foam cloths 11, which are each preferably an integral foam part of the cushioning foam 7 and are connected to this foam via a film hinge. Space is left for a run-tearing strip 12 between the foam cloths 11.

Figure 5:
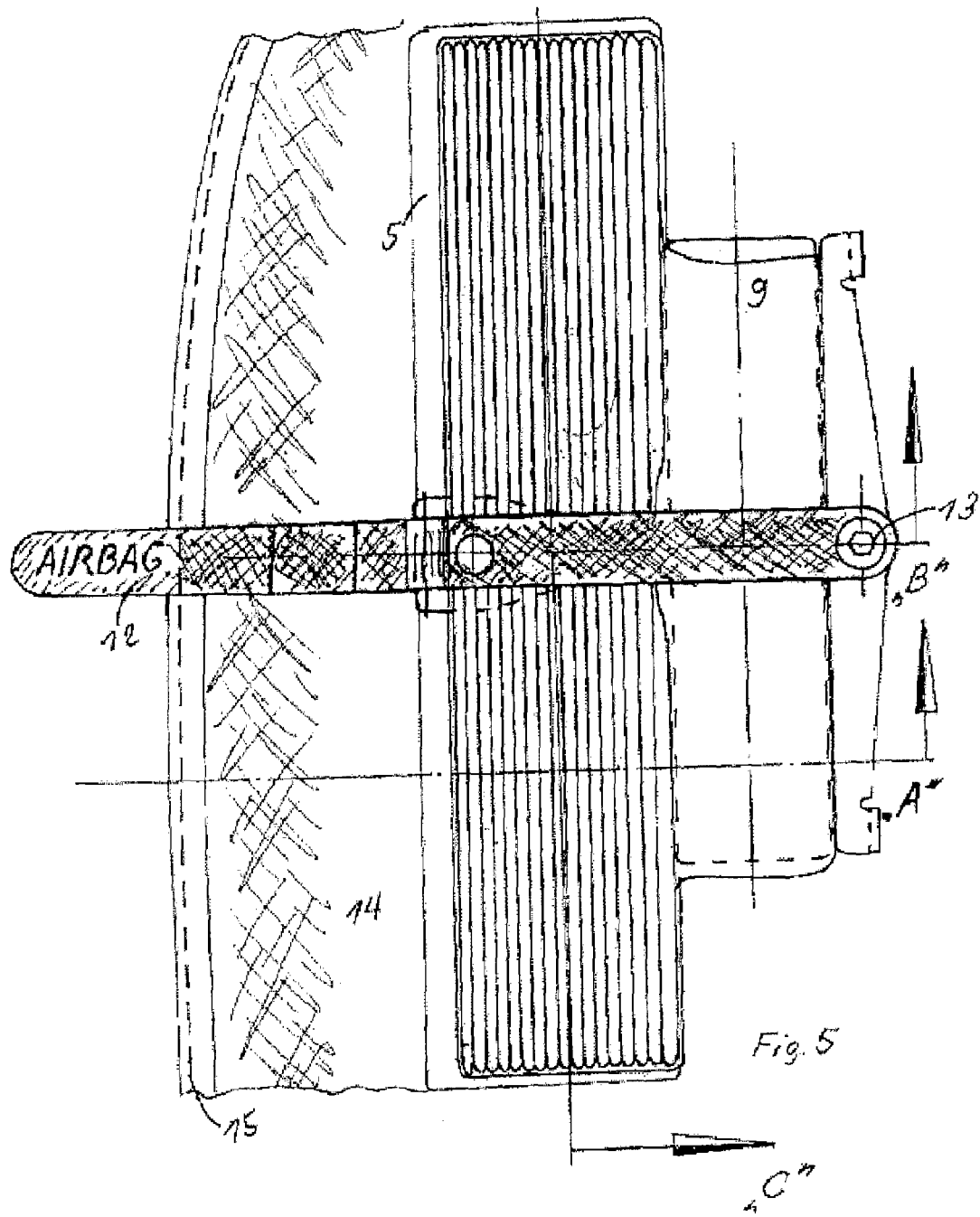
FIG. 5 shows a detail of the first embodiment of a seat with a thorax airbag device from FIG. 4, partially opened, in a schematic top view.

FIG. 5 shows the installation of the run-tearing strip 12 in the module 9 with a captive screw 13 inserted into a grommet. This screw 13 is the common attachment of the module 9 and the run-tearing strip 12.

For mounting the module 9, it is interlocked with the mounting plate 3. The common screw connection of the module 9 and run-tearing strip 12 advantageously guarantees that the latter is fixed.

Figure 6:
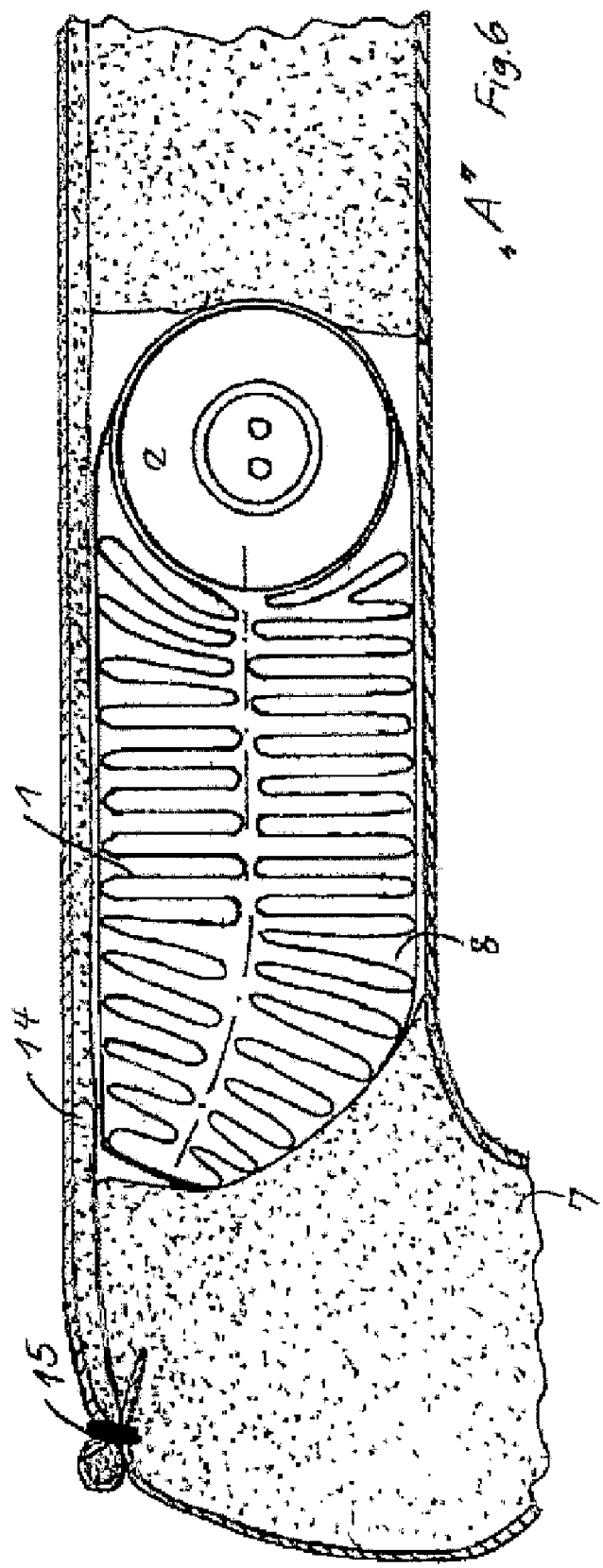
FIG. 6 shows the first embodiment of the first embodiment of a seat with a thorax airbag device from FIG. 4 in a schematic section view according to the viewing direction "A" in FIG. 5.

FIG. 6 shows, in section "A" of FIG. 5, storage of the module 9 without a housing in the cavity 8 of the cushioning foam 7. The airbag 1 is alternatively provided underneath with sliding film 5 and is held together on top with an adhered, thin paper sleeve, or the like, e.g., as a mounting aid.

Figure 7:
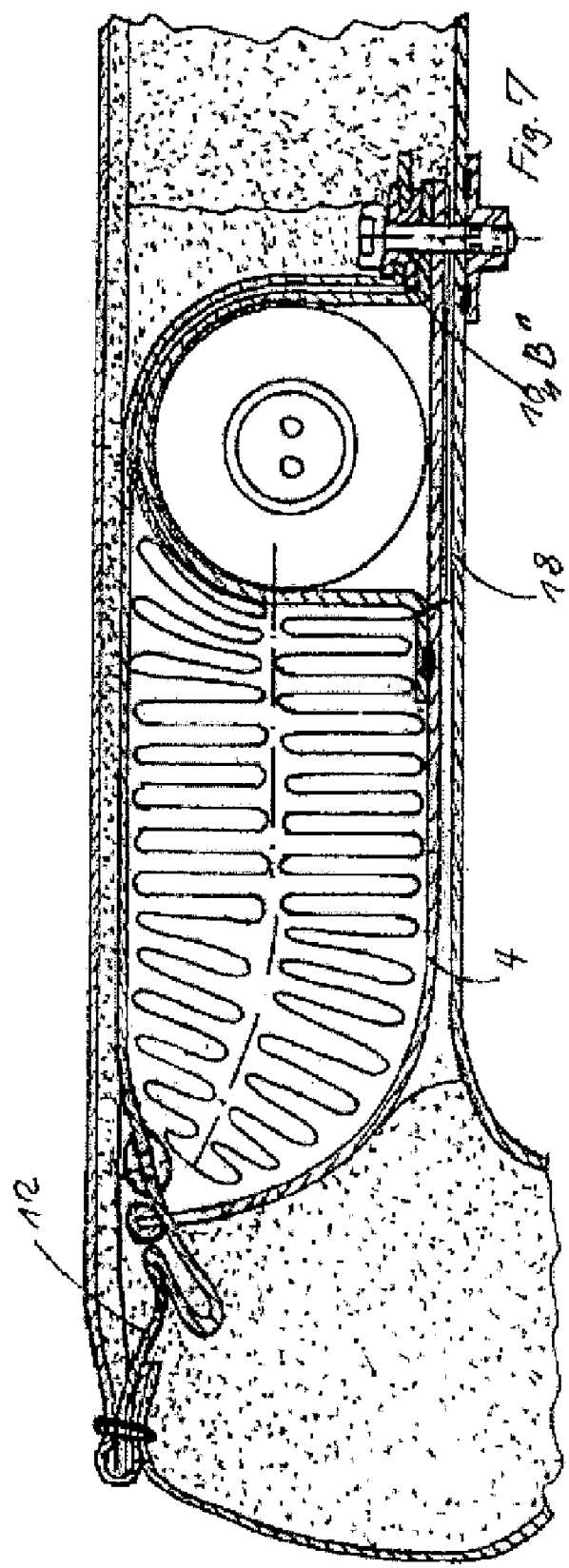
FIG. 7 shows the first embodiment of the first embodiment [sic] of a seat with a thorax airbag device from FIG. 4 in a schematic section view according to the center section "B" in FIG. 5.

FIG. 7 shows, in the middle section "B" of FIG. 5, the attachment of the run-tearing strip 12 to a seat covering 14, the passage through a hole 16 in the guide yoke 4 past a sliding block 17, and the attachment to the seat back frame by means of a grommet 10 and the captive screw 13.

Figure 8:
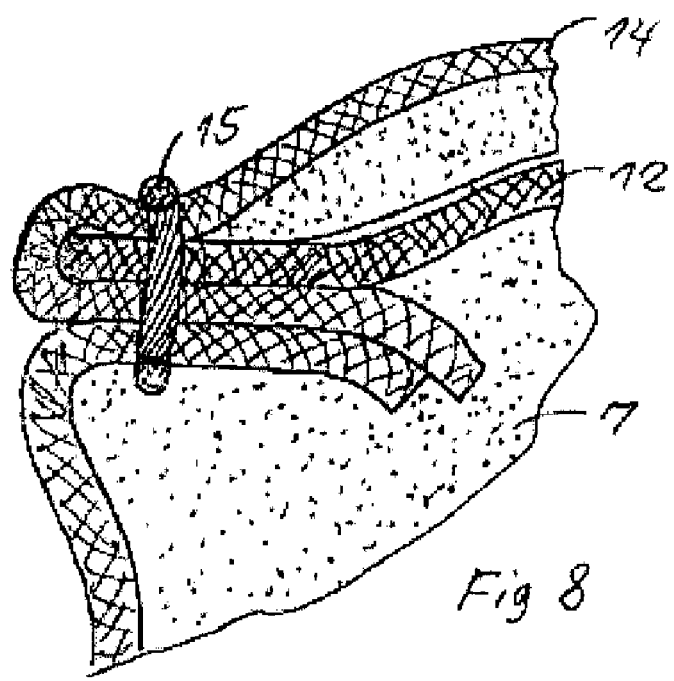
FIG. 8 shows a detail of an alternative of sewing the run-tearing strip in the seat covering of a seat with a thorax airbag device in a schematic side view.

FIG. 8 shows in detail an alternative of sewing the run-tearing strip 12 in the seat covering 14.

Figure 9:
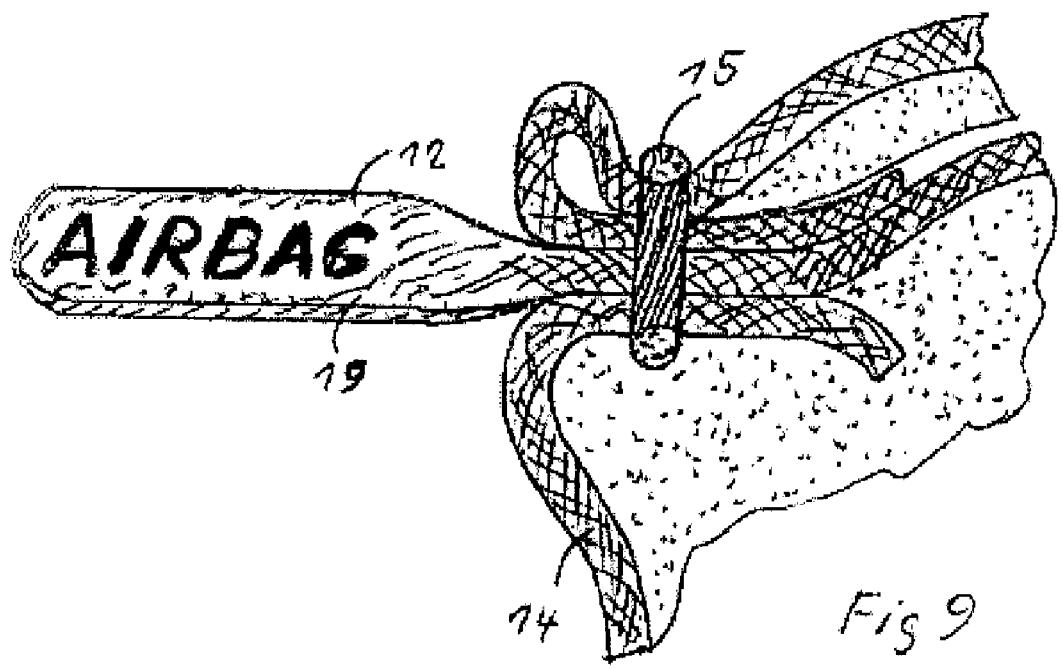
FIG. 9 shows a detail of another alternative of sewing the run-tearing strip in the seat covering of a seat with a thorax airbag device with visible "airbag label" in a schematic section view.

FIG. 9 shows in detail another alternative with a visible "airbag label" 19.

Figure 10:
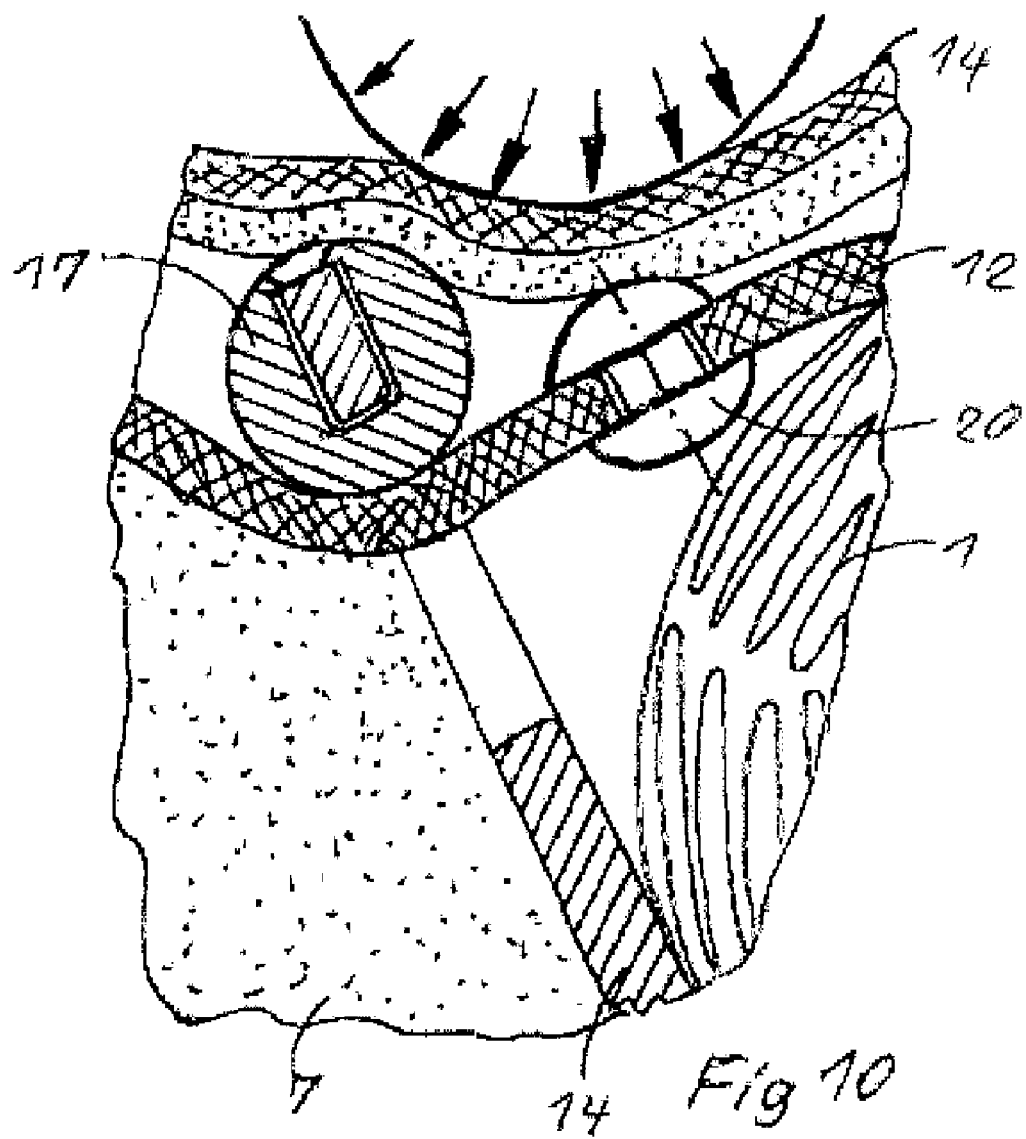
FIG. 10 shows a detail of a second embodiment of a seat with a thorax airbag device in a schematic section view.
Figure 76:
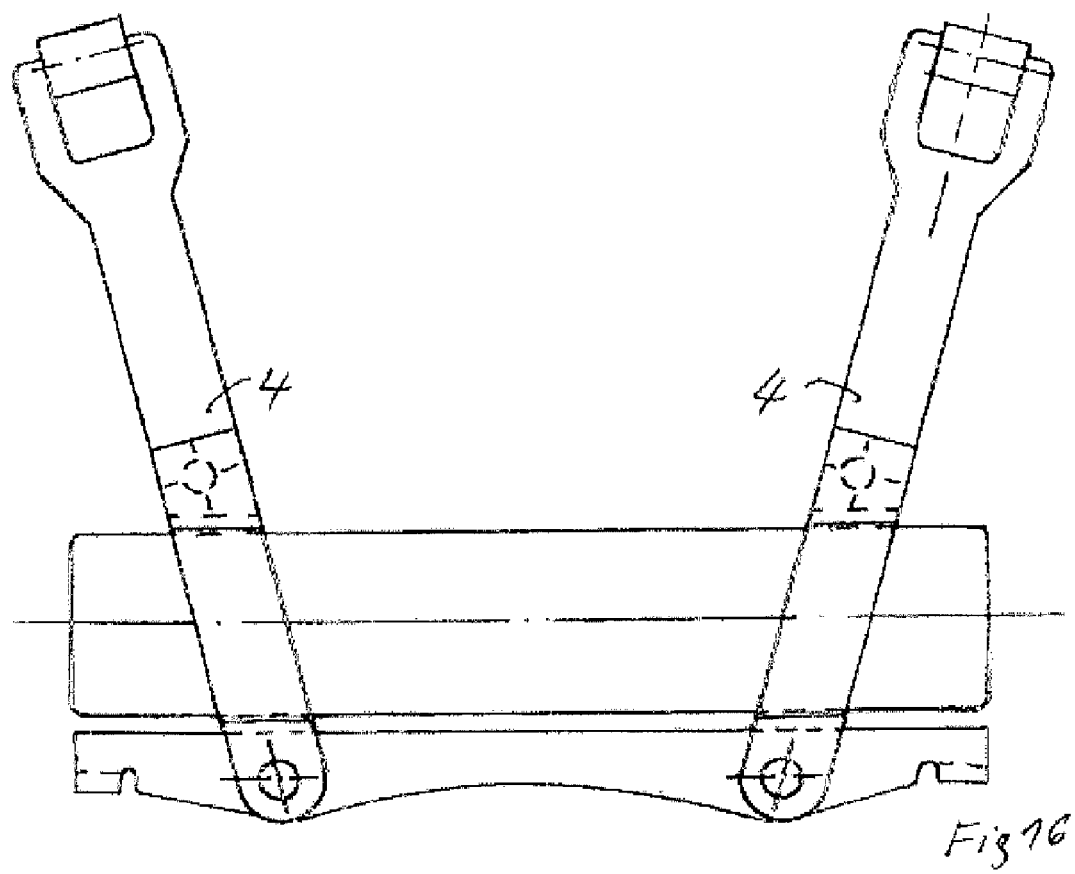

FIG. 10 shows in detail the passage of the run-tearing strip 12 through a hole 16 in the guide yoke 4 past a sliding block 17. The sliding block 17 is used as a guide as an alternative to a bare sheet, when it is preferred or needed due to the slippage characteristics of the run-tearing strip 12.

As a special inventive feature, an assembly feeler 20 is shaped in the form of a raised section (e.g., as a rivet). When the run-tearing strip 12 is mounted correctly one can feel the sliding block 17 in the finished seat under the seat covering 14, parallel and next to the assembly feeler 20. This allows, in particular, a verification of correct assembly. If the assembly feeler 20 lies above or below the sliding block 17, then the run-tearing strip 12 has not been placed through the hole 16.

The attachment of the run-tearing strip 12 is visible and can be felt when screwed in place with the screw 13 fastened in the grommet 10 in the run-tearing strip, like module 9. This is also used for foolproof assembly and thus verification.

FIG. 11 shows in the center section the beginning of the airbag unfolding process. The airbag 1 presses against the run-tearing strip 12. This pulls the tearing seam 15 against the guide yoke 4.

In FIG. 12, the tearing seam 15 of the seat covering 14 is severed by means of the run-tearing strip 12 as time progresses and opens like a zipper for the passage of the airbag 1.

Because the airbag 1 must first activate the run-tearing strip 12, it is advantageous to first guide the gas into a central zone 22 of the airbag 1 sewn with tearing seams 21. (FIG. 13).

FIG. 14 shows the movement of the sewn zone 22 at the beginning of the crash.

FIG. 15 shows a separately installed auxiliary bag 23 in a center zone 24. This has, alternatively, the advantage of a more concentrated, higher pressure application due to the better material of the auxiliary bag 23. The auxiliary bag 23 is sewn so that the bursting seams guide and distribute the gas in the predetermined direction.

FIG. 16 shows, alternatively, the construction for a two-zone bag, e.g. for protecting the thorax and pelvis. It is advantageous when both bag zones emerge from the tearing seam 15 at predetermined positions of the seat covering 14. At these positions, the run-tearing strips 12 are sewn with the seat covering 14 and guided in correspondingly arranged guide yokes 4.

FIG. 17 shows an alternative embodiment of the sewing of the run-tearing strip 12. By means of the angled pulling direction, as shown in FIG. 17, the tearing seam 15 is severed stitch 26 by stitch 26, essentially one by one. Thus, easy tearing is possible in the alternative tearing seam, shown here as a double lap seam 25. The angled run-tearing strip connection 27 also produces a large hole for the initial airbag deployment (not shown), which advantageously has a favorable effect on the unfolding. As shown in FIG. 18, the run-tearing strip 12 is sewn at an angle according to the illustration. The incision is placed in the "angle." In addition, the run-tearing strip 12 is sewn with only a single stitch (not shown). FIG. 19 shows the joining of the tearing seam as a double lap seam 25. Obviously, this run-tearing strip arrangement 12 can be used for all conceivable seam forms.

FIGS. 20 to 23 show a tearing seam as a double lap seam 25 with continuous run-tearing strip 12, sewn with an airbag label 28 in the form of an angled run-tearing strip 12. FIG. 20 shows the first sewing step. FIG. 21 shows the second and last sewing step. FIG. 22 shows the view of the run-tearing strip 12. FIG. 23 shows another sewing alternative to FIG. 21 with the goal of a "flatter" run-tearing seam 12 in the seat covering 14.

In all of the run-tearing seams, a tearing thread 29, which is calibrated in tests and normally weaker, is used as the lower thread.

FIG. 24 shows the integration of the guide yoke 4 into the seat back frame 18 as a section at this position. Obviously, this guide yoke can also be fixed separately to the seat back frame 18. The run-tearing strip is sewn overlapping 29 at this position, in order to be able to feel the thicker section after assembly. This is preferably part of verification, i.e., the guarantee of correct assembly.

Special advantages of such thorax airbag devices according to the invention and seats provided with these devices, as well as methods for activating such thorax airbags according to the invention are:

1. Economical construction.
2. Low weight by eliminating the housing.
3. A nevertheless good "package" of the bag, because it is packed between the guide yoke and the run-tearing strip.
4. Fast opening of the covering by the run
5. Exact-position opening of the covering by the run.
6. Low aggressiveness of the bag through pre-opened seat covering.
7. Simple handling of the strip during sewing and assembly.
8. No extra verification necessary, because correct assembly can be detected in the finished seat itself.
9. Low variation in the test results, because the same strip always determines the opening time.
10. Any type of material has no effect on the crash results or deployment of the bag.

In summary, another improvement for thorax airbag devices and seats provided with these devices, as well as methods for activating thorax airbags, is realized by the present invention, in particular with the following advantages:

1. Fast, invisible bag under the seat back covering, with low aggressiveness.
2. The seat covering stretching capacity has no effect.
3. No extra verification necessary.
4. Low weight and costs.
5. Best visual appearance.

The invention has been described with reference to the embodiments in the description and in the drawings merely as examples and is not limited to these embodiments, but instead includes all variations, modifications, substitutions, and combinations that can be taken by someone skilled in the art from the present document, in particular, within the scope of the claims and the general descriptions in the introduction of this description, as well as from the description of the embodiments and their illustrations in the drawing, and that can be combined with his technical knowledge, as well as the state of the art. In particular, all of the individual features and possible constructions of the invention and their embodiments can be combined.

The invention claimed is:

1. Thorax airbag device, for mounting in a seat without a housing, comprising a thorax airbag held between a guide yoke and a run-tearing strip both of which are coupled to a mounting part, and constructed such that the run-tearing strip is sewn to a seat covering with a tearing seam, wherein the run-tearing strip emerges from the tearing seam as a visible airbag label.

2. The device of claim 1, wherein the run-tearing strip is sewn to the tearing seam.

3. Thorax airbag device, for mounting in a seat without a housing, comprising a thorax airbag held between a guide yoke and a run-tearing strip constructed such that the run-tearing strip is sewn to a seat covering with a tearing seam, wherein the run-tearing strip is led through an opening in the guide yoke, and wherein a sliding block of the guiding yoke creates a perceivable raised section formed at the run-tearing strip position of passage through the opening in the guide yoke to provide evidence of correct assembly.

4. The device of claim 3, wherein a gas generator operatively coupled to the airbag is mounted on one of the mounting part and guide yoke.

5. A device according to claim 3, wherein the perceivable raised section is assisted by a rivet located adjacent to the opening in the guide yoke over which the run-tearing strip passes.

6. Thorax airbag device, which is mounted in a seat of a vehicle without a housing, comprising a thorax airbag held between a guide yoke and a run-tearing strip both of which are coupled to a mounting part, and constructed such that the run-tearing strip is sewn to a seat covering with a tearing seam, wherein the airbag is provided with a sewn/adhered center zone such that this applies pressure first to the run-tearing strip for generating an early run.

7. Thorax airbag device, which is mounted in a seat of a vehicle without a housing, comprising a thorax airbag held between a guide yoke and a run-tearing strip both of which are coupled to a mounting part, and so constructed that the run-tearing strip is sewn to a seat covering with a tearing seam, wherein an additional auxiliary bag made of sturdier textile is provided between the guide yoke and run-tearing strip for opening the tearing seam more quickly with smaller volume and higher pressure and distributing gas in a predetermined way through targeted weakening of tearing seams.

8. Thorax airbag device, for mounting in a seat without a housing, comprising a thorax airbag held between a guide yoke and a run-tearing strip both of which are coupled to a mounting part and so constructed such that the run-tearing strip is sewn to a seat covering with a tearing seam, wherein the end of the run-tearing strip is sewn into the vehicle seat tearing seam, and a gas generator operatively coupled to the airbag is mounted on one of the mounting part and guide yoke, wherein the run-tearing strip is led through an opening in the guide yoke, and wherein a perceivable raised section is formed at the run-tearing strip position of passage through the opening in the guide yoke indicative of correct assembly.

\* \* \* \* \*